United States Patent [19]

Saikku

[11] 4,106,537
[45] Aug. 15, 1978

[54] FELLING AND CUTTING DEVICE

[75] Inventor: Antti Tuomas Saikku, Ulvila, Finland

[73] Assignee: Rauma-Repola Oy, Finland

[21] Appl. No.: 762,192

[22] Filed: Jan. 24, 1977

Related U.S. Application Data

[63] Continuation-in-part of Ser. No. 747,472, Dec. 3, 1976, abandoned, Continuation-in-part of Ser. No. 747,472, Dec. 3, 1976, abandoned.

[51] Int. Cl.² .............................................. A01G 23/08
[52] U.S. Cl. .................................... 144/34 R; 83/672; 144/34 E
[58] Field of Search ................. 144/3 D, 34 R, 34 E, 144/34 F, 176, 240, 218; 83/340, 672, 680

[56] References Cited

U.S. PATENT DOCUMENTS

| 3,626,477 | 12/1971 | Fulghum, Jr. ...................... 144/34 E |
| 3,626,477 | 12/1971 | Fulghum, Jr. ...................... 144/34 E |
| 3,969,966 | 7/1976 | Dillon ........... 83/Swecker & Mathis |
| 3,969,966 | 7/1976 | Dillon ................................. 83/672 X |

Primary Examiner—Othell M. Simpson
Assistant Examiner—W. D. Bray
Attorney, Agent, or Firm—Burns, Doane, Swecker & Mathis

[57] ABSTRACT

A device for cutting or felling trees comprises a rotating blade of uniformly increasing width in the shape of a partial, truncated cone mounted on the edge of a base disk. The blade does not extend completely around the base disk. Cutting is performed by attacking the tree at an angle and rotating the blade in the direction of increasing width.

6 Claims, 4 Drawing Figures

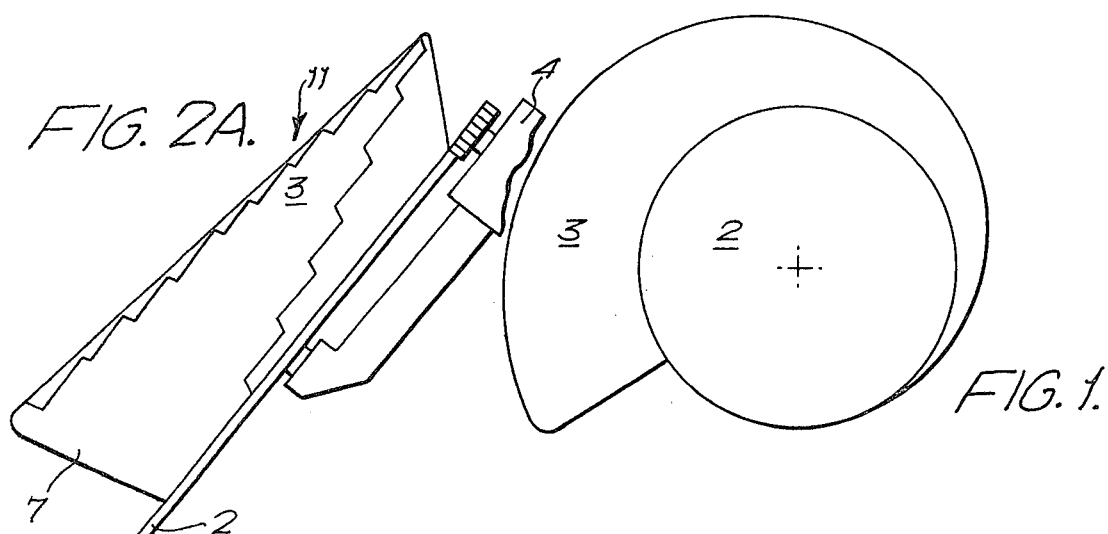
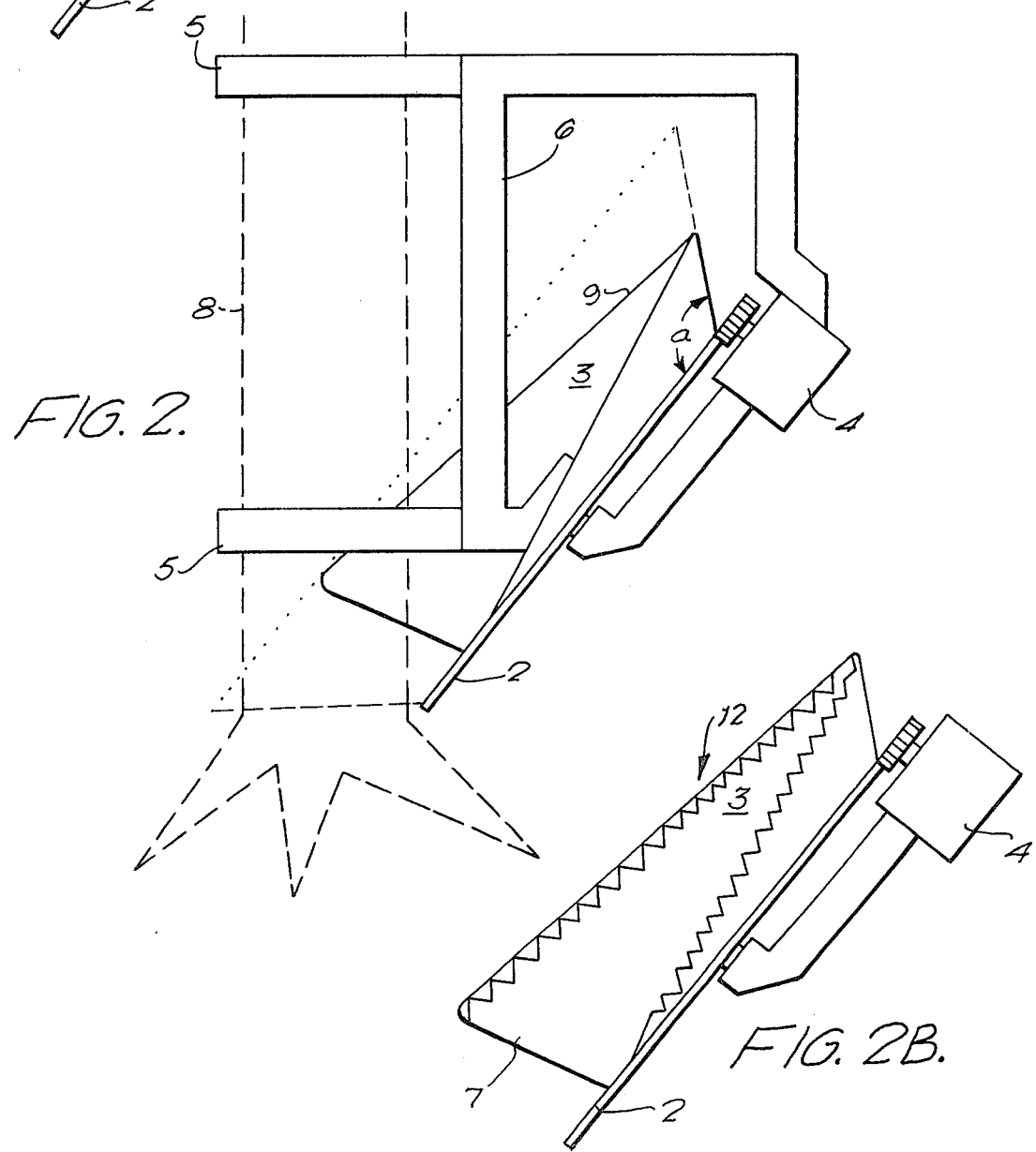

FELLING AND CUTTING DEVICE

CROSS REFERENCE TO RELATED APPLICATION

This application is a continuation-in-part of Ser. No. 747,472, filed Dec. 3, 1976, now abandoned.

The invention is concerned with the cutting portion of the felling or cutting device.

Known devices, as a rule, operate either on the sawing principle or on the guillotine principle. A drawback of these devices is then complicated and expensive construction. Sensitivity to disturbances is a weak point of a saw device, because the rapidly moving saw chain or saw blade is damaged badly when, under practical conditions, it comes into contact with a foreign object, such as, a stone or equivalent. This results in the blade of the device having to be put in repair. Frequent interruptions of this nature result in reduced output. Furthermore use of the devices requires great care and precision from its operator.

The guillotine-type cutting devices are more reliable in operation, but, due to their mode of operation, they cause mechanical damage to the wood. For this reason according to current opinion, they are not suitable for felling or cutting trunks intended for lumber. In accordance with the present invention there is provided a slower-operating device having a curved cutting track which slashes the wood fibers instead of tearing them.

By means of the device of the present invention, it has been possible to combine (a) the reliability of operation of the guillotine-type devices, because the device has no blade that moves fast and soon becomes dull and (b) the undamaged products of the saw-type devices because of the curved cutting track and the cutting of the wood fibres by slashing.

The construction of one embodiment of the felling and cutting device in accordance with the invention is shown in the accompanying drawings wherein FIG. 1 shows a front view of the cutting portion and FIG. 2 shows a side view of the cutting portion, as well as the tree to be felled, the holding means, and the motor rotating the cutting portion fastened to the frame of the device.

FIG. 2A shows a side view of the cutting portion wherein the width of the cutting edge of the blade increases in a stepwise manner.

FIG. 2B shows a side view of the cutting portion wherein the cutting edge of the blade is toothed.

The cutting portion shown in FIG. 1 consists of two components: a circular base disk 2 and a cutting blade 3, having a cutting edge 9, fastened to the disk, e.g., at an angle "a" of 120°. The cutting blade 3 is fastened to the edge of the base disk 2 so that part of the edge of the base disk 2 remains free of the blade, for example 1/6 of the edge. The width of the blade 3 becomes uniformly wider, e.g., from 0 cm to 60 cm, depending on the desired dimensioning. The shape of the blade 3 in relation to the base disk 2 can be characterized as a partial truncated cone in which the base disk 2 is the cut-off section of the cone and the blade 3 is a part of the side of the truncated cone. The cone is characterized as "partial" because, as shown in FIGS. 1 and 2, the blade does not extend completely around the circumference of disk 2. As shown in FIG. 2A the width of the cutting edge of blade 3 may increase in a number of steps 11. As shown in FIG. 2B the cutting edge of the blade may be provided with a number of teeth 12.

The cutting portion is mounted to the frame 6 of the device so that, after grasping of the tree 8, the blade 3 is, at the bottom edge of the cutting portion, perpendicular to the tree. The device is provided with a motor for rotating the cutting portion and with holding means 5.

Operation of the device in accordance with the invention is as follows:

The cutting portion is rotated by the motor 4 into such a position that the blade-free section at the edge of the base disk 2 is facing down, i.e. is positioned on the same straight line with the holding means 5. The tree is grasped firmly by the holding means 5, the blade-free edge of the base disk 2 being at the desired cutting point. By means of the motor 4, the cutting portion is rotated in the direction in which the blade 3 becomes wider. Then, when rotating and uniformly becoming wider, the the cutting edge 9 of blade 3 cuts the tree by slashing until the width of the mantle is larger than the diameter of the tree.

The rear edge 7 of the mantle 3 can also be sharpened so that when necessary, the blade can be rotated in the opposite direction. Rotation in the opposite direction can be either continuous or in the form of a short stroke only. Rotation in the opposite direction may be useful when felling small trees.

What I claim is:

1. A device for cutting or felling a tree comprising:
   (a) a rotatable base disk, and
   (b) a curved cutting blade of increasing width in the shape of partial truncated cone mounted along a portion of the periphery of the base disk, said disk constituting a truncating plane, the increasing width of said blade causing the cutting edge thereof to be located progressively farther from the truncating plane, the widest portion of the blade having an edge constituting a rear edge extending abruptly downward to the surface of the base disk.

2. The device of claim 1 wherein the width of the cutting blade increases continuously.

3. The device of claim 1, wherein the width of the cutting blade increases in a stepwise manner.

4. The device of claim 1 wherein the cutting edge of the blade is toothed.

5. The device of claim 1 wherein the rear edge is sharpened to provide a cutting edge.

6. The device of claim 1 further comprising:
   (a) a framework for rotatably mounting the base disk;
   (b) holding means connected to said framework for attaching said device in cutting relation to a tree; and
   (c) means connected to said base disk for rotating said disk and cutting blade.

* * * * *